US007576729B2

(12) United States Patent
Medina

(10) Patent No.: US 7,576,729 B2
(45) Date of Patent: Aug. 18, 2009

(54) FOOT CONTROLLED COMPUTER MOUSE WITH FINGER CLICKERS

(76) Inventor: Carlos A. Medina, 4717 W. Estrella St., Tampa, FL (US) 33629

( * ) Notice: Subject to any disclaimer, the term of this patent is extended or adjusted under 35 U.S.C. 154(b) by 617 days.

(21) Appl. No.: 11/298,124

(22) Filed: Dec. 9, 2005

(65) Prior Publication Data

US 2006/0125795 A1 Jun. 15, 2006

Related U.S. Application Data

(60) Provisional application No. 60/634,665, filed on Dec. 9, 2004.

(51) Int. Cl.
*G06F 3/033* (2006.01)
(52) U.S. Cl. ........................ 345/158; 345/163
(58) Field of Classification Search ......... 345/156–167, 345/183
See application file for complete search history.

(56) References Cited

U.S. PATENT DOCUMENTS 5,907,318 A * 5/1999 Medina ...................... 345/163
2004/0012559 A1* 1/2004 Seki et al. ................... 345/156
2004/0227741 A1* 11/2004 Koda et al. .................. 345/183

* cited by examiner

*Primary Examiner*—Chanh Nguyen
*Assistant Examiner*—Adam J Snyder
(74) *Attorney, Agent, or Firm*—Robert M. Downey PA

(57) ABSTRACT

A device for generating and delivering control signals to a computer has a housing with a top foot engaging surface on a top portion. Roller bearings captivated between the top portion and a base portion are disposed in moving engagement with a plate, thereby allowing the user's foot to move the top portion relative to the base. Optical sensors detect movement of the top portion and transmit electrical signals to a microcontroller which interprets the linear directional movement relative to X and Y coordinates. The user's foot is selectively moved over either a left or right light sensor to perform left and right mouse click operations. An external RCA jack allows for attachment of external cursor control devices, such as hand or finger operated mouse click controls. In one embodiment, magnetic switches are provided in a keyboard to perform left and right click operations, wherein a magnetic ring worn on the hand of the user is selectively passed over either a left or right magnetic switch to perform the left or right click operation. In an alternative embodiment, magnetic switch devices are worn on a finger of the left and right hands and magnetic rings worn on the thumbs are used to selectively perform the left and right click operations by moving the magnetic ring on either the left or right hand in close proximity to the magnetic switch worn on the same hand.

7 Claims, 3 Drawing Sheets

FOOT CONTROLLED COMPUTER MOUSE WITH FINGER CLICKERS

This patent application is based on provisional patent application Ser. No. 60/634,665 filed on Dec. 9, 2004 for which applicant claims the benefit under Title 35, United States Code section 119 (e).

BACKGROUND OF THE INVENTION

1. Field of the Invention

The present invention is directed to a foot controlled computer mouse for use independently or in conjunction with hand operated cursor and/or mouse click control devices for delivering control signals to a computer.

2. Discussion of the Related Art

The operating systems of most modern day computers, including the software which runs these computers, is largely dependent on the use of a mouse for moving a pointer or cursor on the display and to activate specific areas and/or icons on the display. Operating systems such as WINDOWS 98, WINDOWS 2000, WINDOWS NT, WINDOWS XP and MAC OS require the user to use a hand operated mouse in order to perform numerous functions for operating the computer and software programs. Further, use of various programs to navigate on the Internet is highly dependent on the point and click operations of a computer mouse.

While the use of a hand operated computer mouse to operate commands and to perform various functions on a computer has been well accepted and is now a standard operating component, there are times when the use of a hand operated mouse is inconvenient. For instance, when completing a form or making entries on a spreadsheet, it is necessary to move the cursor (pointer) to each are on the form and then to click on the mouse in order to activate a specific area prior to making an alphanumeric entry using the keyboard. Performing this task requires the computer operator to constantly remove his/her hand from the keyboard in order to grasp the mouse and move the cursor to the next entry area. This constant hand movement between the keyboard and mouse reduces the efficiency of the computer operator and, sometimes, results in confusion if the operator loses his/her place on the display. In other instances, a typist using a word processing program may find it inconvenient and burdensome to constantly remove their hands from the keyboard in order to operate the mouse when entering menu commands needed to perform various functions of the word processing software.

In view of the problems and limitations associated with the use of a hand operated computer mouse, I have previously developed a foot controlled computer mouse which is disclosed in U.S. Pat. No. 5,907,318, the subject matter of which is incorporated herein by reference. The present invention improves upon my prior invention, as disclosed in U.S. Pat. No. 5,907,318, by providing an optical sensor for detecting foot controlled movement of the top moveable portion of the footmouse device. Additionally, the present invention provides for an external RCA jack which allows for attachment of external clicking devices. In particular, the present invention provides for finger operated clicking devices to perform the left click and right click operations. The housing of the device of the present invention is circular in shape, providing greater freedom of movement, and can be connected to a host computer via USB 1.0, 2.0 and $PS_2$.

SUMMARY OF THE INVENTION

The present invention is directed to a device for generating and delivering control signals to a computer and includes a housing with a top foot engaging surface on a top portion. Roller bearings captivated between the top portion and a base portion are disposed in moving engagement with a plate fitted to the base portion, thereby allowing the user's foot to move the top portion relative to the base. Optical sensors detect movement of the top portion and transmit electrical signals to a microcontroller which interprets the linear directional movement relative to X and Y coordinates. The user's foot is selectively moved over either a left or right light sensor to perform left and right mouse click operations. An external RCA jack allows for attachment of external cursor control devices, such as hand or finger operated mouse click controls. In one embodiment, magnetic switches are provided in a keyboard to perform left and right click operations, wherein a magnetic ring worn on the hand of the user is selectively passed over either a left or right magnetic switch to perform the left or right click operation. In an alternative embodiment, magnetic switch devices are worn on a finger of the left and right hands and magnetic rings worn on the thumbs are used to selectively perform the left and right click operations by moving the magnetic ring on either the left or right hand in close proximity to the magnetic switch worn on the same hand.

BRIEF DESCRIPTION OF THE DRAWINGS

For a fuller understanding of the nature of the present invention, reference should be made to the following detailed description taken in conjunction with the accompanying drawings in which.

Like reference numerals refer to like parts throughout the several views of the drawings.

DETAILED DESCRIPTION OF THE PREFERRED EMBODIMENTS

Figure 1:
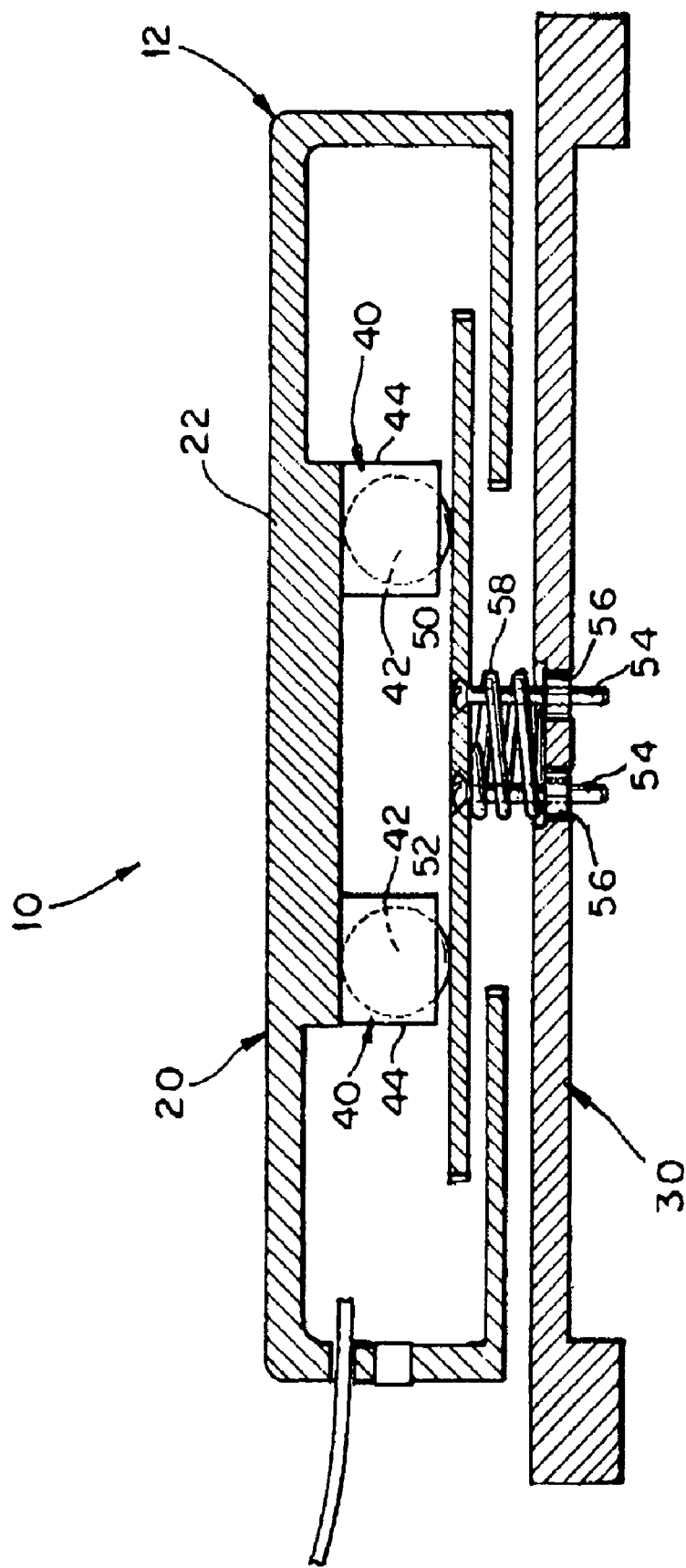
FIG. 1 is a side elevational view, in cross-section, showing a preferred embodiment of the foot controlled computer mouse of the present invention.

Referring to the drawings, and initially FIG. 1, the foot controlled computer mouse is shown and is generally indicated as 10. In particular, the foot controlled computer mouse 10 includes a housing 12 having a top portion 20 and a base portion 30. The top portion includes a top foot engaging surface 22 adapted for placement of the user's foot thereon in order to operate the device 10. In use, the top portion 20 is moved relative to the base portion 30 using one's foot by resting the foot on the top surface 22 and urging the top portion 20 in the desired directional movement corresponding with the desired movement of a cursor or other visual indicator on the monitor of a host computer connected to the device 10. In order to promote movement of the top portion 20, roller bearings 40 are provided between the top portion and the base portion 30. More specifically, balls 42 are movably captivated within cylindrical holders 44 extending downwardly from an underside of the top portion and terminating in spaced relation above a roller engaging surface 52 on a plate 50 which is secured to the base portion 30. As seen in FIG. 1, the balls 42 have a diameter is greater than the overall length of the cylindrical holders 44 so that a portion of the balls 42 protrudes from the open bottom end of the cylindrical holders 44 for rolling engagement with the surface 52. The plate 50 is secured to the base portion 30 via pins 54. The pins 54 are slidably captivated within bushings 56 in the base portion allowing vertical movement of the pins 54 relative to the base portion. A spring 58 fitted about the pins 54 between the plate 50 and base portion 30 permits spring action movement of the plate 50 and the entire top portion 20 relative to the base portion 30, thereby absorbing downward pressure exerted by the foot on the top surface 22, while the spring 58 urges the plate 50 and top portion 20 upwardly to a normal relaxed position, as seen in FIG. 1.

Figure 2:
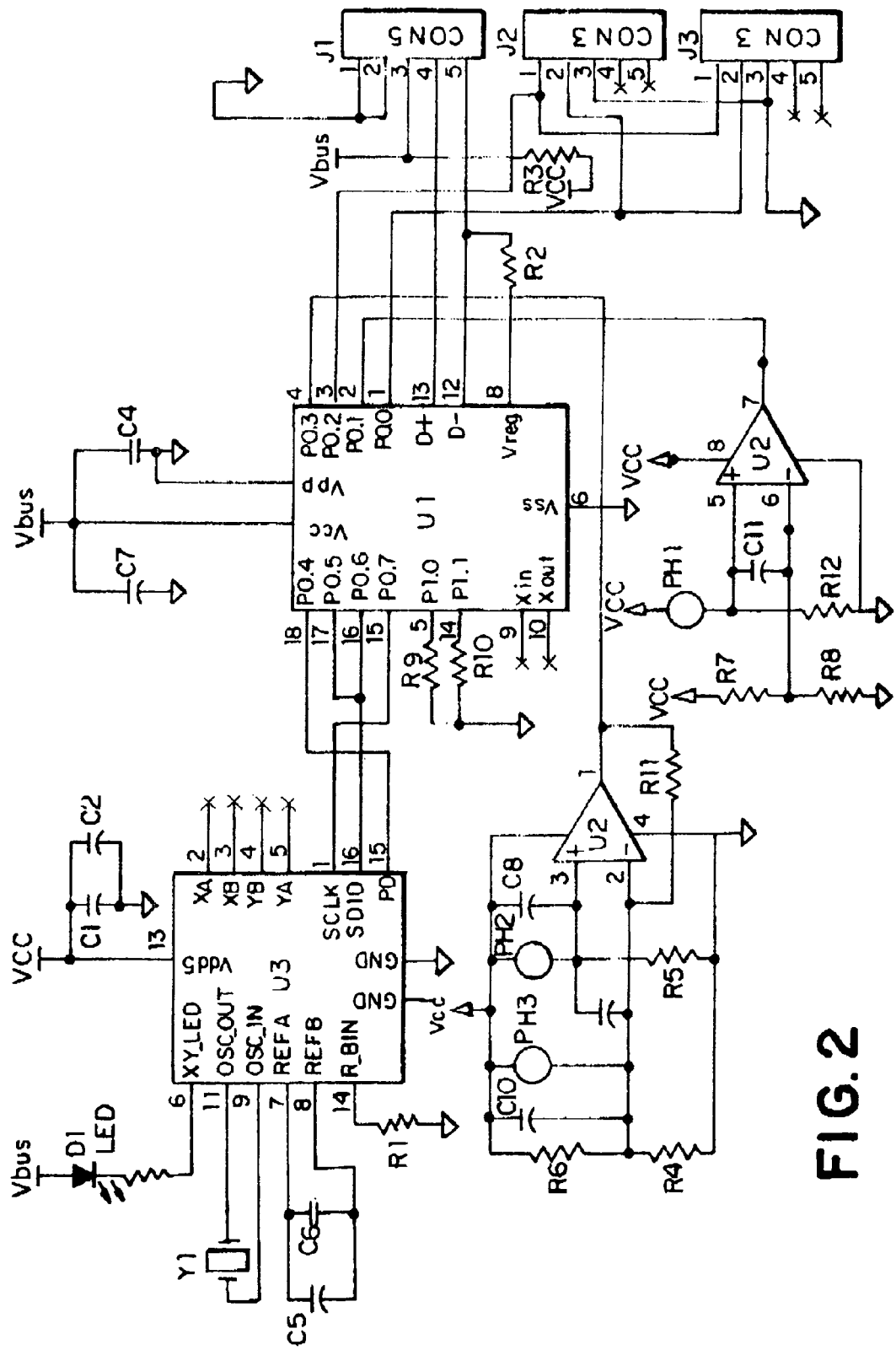
FIG. 2 is a schematic diagram illustrating the component elements of the foot controlled computer mouse, in accordance with a preferred embodiment thereof.

Referring to the schematic diagram of FIG. 2, the foot controlled computer mouse includes optical sensors to detect movement of the top portion relative to the base portion, thereby transmitting electric signals to a microcontroller which interprets the linear directional movement of the top portion relative to X and Y coordinates for directing movement of a cursor or other visual indicator on the computer monitor. Light sensors detect foot movement by comparing sensed light with predetermined ambient light conditions. A left light sensor and center or right light sensor permit a selective left and/or right click operation. More specifically, by moving the foot over the selected light sensor, to thereby block light, the light sensor triggers activation of an electronic signal for completing a left click or right click operation. A USB cable connector is provided for connecting the foot controlled computer mouse to the host computer. An electrical cable connects the device to a keyboard. Additionally, external RCA jacks allow for attachment of external cursor control devices, such as hand or finger operated mouse click controls.

Figure 3:
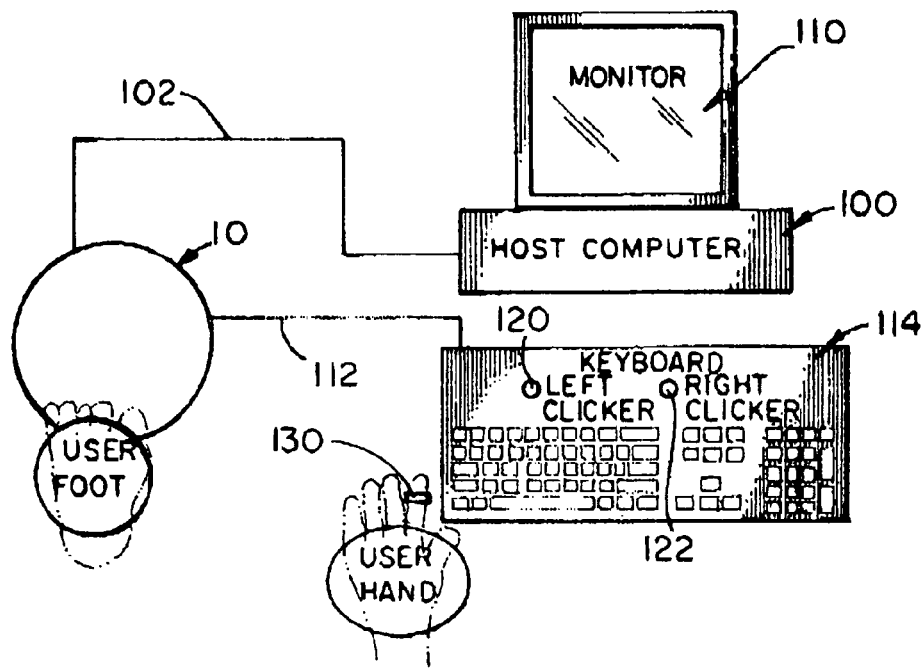
FIG. 3 is a general system diagram showing the foot controlled computer mouse connected to a host computer and keyboard, and further illustrating a finger operated left click and right click controller with the use of a magnetic ring and magnetic sensors on the keyboard.

Referring to FIG. 3, one embodiment of finger click operation controllers is shown. Specifically, the foot controlled computer mouse 10 is connected to host computer 100 via USB cable 102. A video monitor 110 or other display device is provided with the host computer. The foot controlled computer mouse 10 is further connected via an electrical cable 112 to keyboard 114. The keyboard 114 is provided with both a left magnetic switch 120 and a right magnetic switch 122. A magnetic ring 130 is worn on either or both hands of the user, preferably on the index finger. Movement of the magnetic ring 130 over either of the left switches performs the click operation. Specifically, movement of the user's hand to direct the magnetic ring 130 over the left magnetic switch 120 serves to operate the switch and complete the left click operation. Likewise, movement of the user's hand to direct the magnetic ring 130 over the right magnetic switch 122 serves to close the right magnetic switch to perform the right click operation. The left and right click signals are directed through the foot controlled computer mouse circuitry and to the host computer 100.

Figure 4:
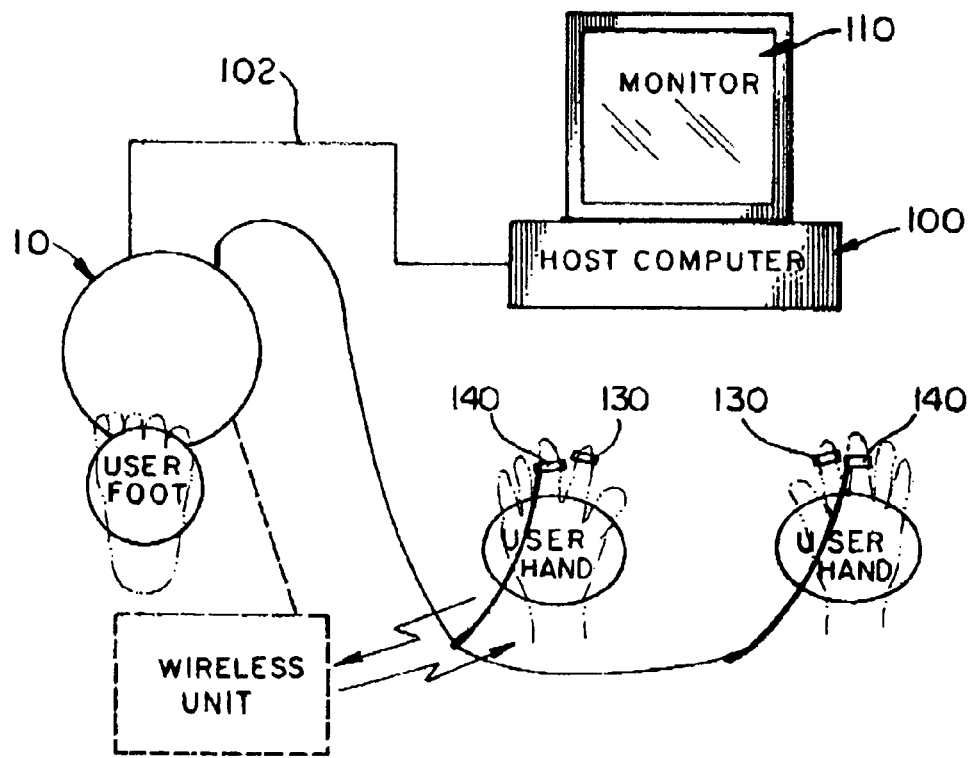
FIG. 4 is a general system diagram illustrating an alternative embodiment of finger controlled click devices connected to the foot controlled computer mouse, wherein magnetic switches are worn on the index fingers of the left and right hands, and a magnetic ring is worn on the thumbs of the left and right hand for performing the left and right click operations.

Referring to FIG. 4, an alternative embodiment of the finger click controller is shown, wherein a ring magnetic switch 140 is worn on each hand of the user, preferably on the index finger. Moreover, a magnetic ring 130 is worn on a finger of each hand of the user, preferably on the thumb. By moving the magnetic ring 130 against or in close proximity to the magnetic ring switch 140 on the same hand, the corresponding left or right click operation is performed. More specifically, moving the magnetic ring 130 against or in close proximity to the magnetic ring switch 140 on the left hand of the user serves to temporarily close the magnetic switch 140, thereby performing the left click operation. Similarly, moving the magnetic ring 130 against or in close proximity of the magnetic ring switch 140 on the right hand of the user serves to temporarily close the magnetic switch 140 to perform the right click operation.

While the instant invention has been shown and described in accordance with a preferred and practical embodiment thereof, it is recognized that departures from the instant disclosure are contemplated within the spirit and scope of the present invention.

What is claimed is:

1. A computer mouse comprising:
    a main housing including a top portion with a top foot engaging surface, and a fixed base portion, said top portion being movable relative to said base portion;
    at least one optical sensor for detecting movement of said top portion relative to said base portion, and said at least one optical sensor being structured and disposed for transmitting electrical signals in response to sensed movement of said top portion;
    a microcontroller for receiving the electrical signals from said at least one optical sensor, and said microcontroller being structured and disposed for interpreting the electrical signals to determine directional movement of said top portion relative to X and Y coordinates; and
    a plurality of sensor switches operable between on and off states for generating left and right mouse click operational signals to perform left and right mouse click operations, and said plurality of sensor switches including magnetic switch devices including a left ring adapted to be worn on a finger of the left hand and a right ring adapted to be worn on a finger of the right hand and a pair of magnetic rings, including a first magnetic ring worn on the left hand and a second magnetic ring worn on the right hand, wherein movement of the left ring within the magnetic field of the first magnetic ring generates said left mouse click operational signal and movement of the right ring within the magnetic field of the second magnetic ring generates said right mouse click operational signal.

2. The computer mouse as recited in claim 1 wherein said plurality of sensor switches further comprise light sensor switches.

3. The computer mouse as recited in claim 2 wherein said light sensor switches are on said top portion of said housing and are operable between said on and said off states by movement of the user's foot in and out of light blocking relation to said light sensor switches.

4. A computer mouse comprising:
    a main housing including a top portion with a top foot engaging surface, and a fixed base portion, said top portion being movably captivated on said base portion so that said top portion is movable relative to said base portion;
    at least one optical sensor for detecting movement of said top portion relative to said base portion and said at least one optical sensor being structured and disposed for transmitting electrical signals in response to sensed movement of said top portion;
    a microcontroller for receiving the electrical signals from said at least one optical sensor, and said microcontroller being structured and disposed for interpreting the electrical signals to determine directional movement of said top portion relative to X and Y coordinates;

a plurality of sensor switches on said top portion of said main housing and said plurality of sensor switches being operable between on and off states for generating left and right mouse click operational signals to perform left and right mouse click operations;

means on said main housing for connection of an external cursor control device; and said external cursor control device including hand operated magnetic switch devices comprising a left ring adapted to be worn on a finger of the left hand and a right ring adapted to be worn on a finger of the right hand and a pair of magnetic rings, including a first a magnetic ring worn on the left hand and a second magnetic ring worn on the right hand, wherein movement of the left ring within the magnetic field of the first magnetic ring generates said left mouse click operational signal and movement of the right ring within the magnetic field of the second magnetic ring generates said right mouse click operational signal.

5. The computer mouse as recited in claim 4 wherein said plurality of sensor switches comprise light sensor switches.

6. The computer mouse as recited in claim 5 wherein said light sensor switches are on said top portion of said housing and are operable between said on and said off states by movement of the user's foot in and out of light blocking relation to said light sensor switches.

7. A computer mouse comprising:

a main housing including a top portion with a top foot engaging surface, and a fixed base portion, said top portion being movable relative to said base portion;

at least one optical sensor for detecting movement of said top portion relative to said base portion, and said at least one optical sensor being structured and disposed for transmitting electrical signals in response to sensed movement of said top portion;

a microcontroller for receiving the electrical signals from said at least one optical sensor, and said microcontroller being structured and disposed for interpreting the electrical signals to determine directional movement of said top portion relative to X and Y coordinates;

a plurality of sensor switches operable between ON and OFF states for generating left and right mouse click operational signals to perform left and right mouse click operations;

said plurality of sensor switches including light sensor switches on said top portion of said housing and said light sensor switches being operable between said ON and said OFF states by movement of the user's foot in and out of light blocking relation to said light sensor switches; and said plurality of sensor switches further including magnetic switch devices comprising a left ring adapted to be worn on a finger of the left hand and a right ring adapted to be worn on a finger of the right hand and a pair of magnetic rings, including a first magnetic ring worn on the left hand and a second magnetic ring worn on the right hand, wherein movement of the left ring within the magnetic field of the first magnetic ring generates said left click operational signal and movement of the right ring within the magnetic field of the second magnetic ring generates said right click operational signal.

* * * * *